June 5, 1956

J. J. NASH ET AL 2,748,830

METHOD AND APPARATUS FOR MAKING SPIRAL WOUND
SYNTHETIC PIPING AND TUBING

Filed Jan. 14, 1953

INVENTORS.
JOHN J. NASH
BY GEORGE A. STEIN

Alfred W. Petchaft
ATTORNEY

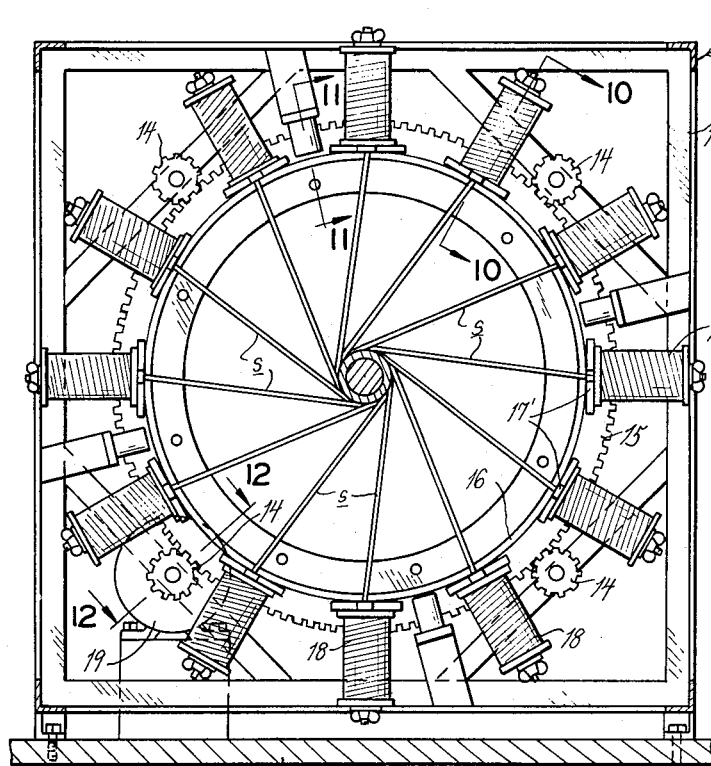
FIG. 3.
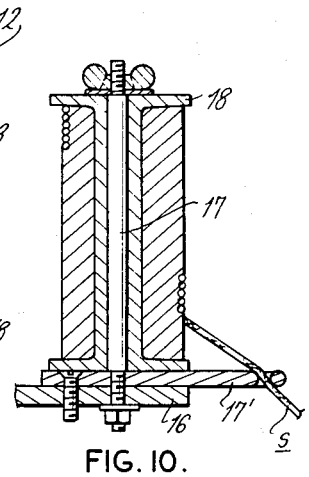
FIG. 10.
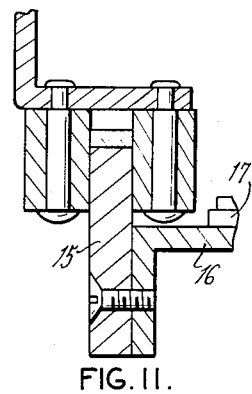
FIG. 11.
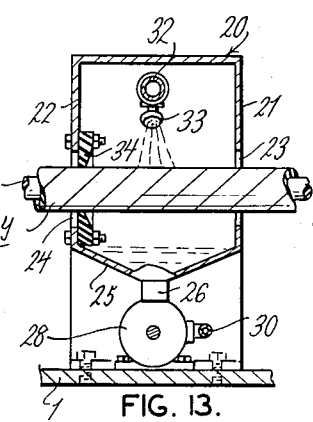
FIG. 7.
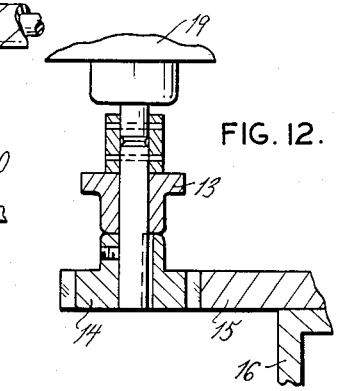
FIG. 13.
FIG. 12.
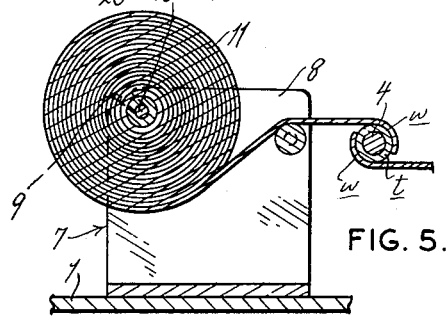
FIG. 5.
INVENTORS.
JOHN J. NASH
GEORGE A. STEIN
BY
ATTORNEY

United States Patent Office 2,748,830
Patented June 5, 1956

2,748,830

METHOD AND APPARATUS FOR MAKING SPIRAL WOUND SYNTHETIC PIPING AND TUBING

John J. Nash, Normandy, Mo., and George A. Stein, Cleveland, Ohio, assignors, by mesne assignments, to American Fixture, Inc., a corporation of Missouri Application January 14, 1953, Serial No. 331,213

12 Claims. (Cl. 154—1.8)

This invention relates in general to certain new and useful improvements in high-pressure non-metallic tubing and methods of making the same and is related to application Serial No. 331,212, filed contemporaneously herewith, and to applications Serial Nos. 288,648 and 288,649, filed May 19, 1952, by John J. Nash.

As pointed out in the above-mentioned co-pending applications Serial Nos. 288,648 and 288,649, conventional metallic pipe presents a number of technological problems in industrial and related piping installation, such as crude oil gathering systems, subterranean oil and gas pipe lines, and steam and pressure systems employed in certain types of naval vessels to be used as mine sweepers or for similar purposes. These technological fields of application are illustrations of uses in which metallic piping and tubing are found to be unsatisfactory and for which some type of dielectric non-magnetic piping or tubing becomes almost essential.

It is, therefore, one of the primary objects of the present invention to provide a dielectric non-magnetic pipe or tube formed of synthetic materials and which is extremely strong, rigid, and capable of sustaining relatively high internal or bursting pressure and is, therefore, adapted for use in a wide variety of engineering applications for which hitherto only metal piping has been sufficiently strong.

Another object of the present invention is to provide piping or tubing formed of synthetic materials including thermosetting resins.

It is another object of the present invention to provide piping or tubing of the type stated which is initially formed as a spiral winding, the convolutions of which are integrally bonded together by polymerization of thermosetting resins forming a component of the piping or tubing and resulting in an extremely strong, rigid, durable structure.

It is a further object of the present invention to provide a method and apparatus for manufacturing spiral wound synthetic piping or tubing of the type stated.

It is also an object of the present invention to provide apparatus for manufacturing piping or tubing of the type stated in a continuous manner.

In the accompanying drawings (two sheets)—

Figure 1 is a top plan view of synthetic pipe manufacturing apparatus constructed in accordance with and embodying the present invention;

Figures 2, 3, 4, 5, 6, and 7 are fragmentary sectional views taken along lines 2—2, 3—3, 4—4, 5—5, 6—6, and 7—7, respectively, of Figure 1;

Figures 10, 11, and 12 are fragmentary sectional views taken along lines 10—10, 11—11, and 12—12, respectively, of Figure 3; and Figure 13 is a fragmentary sectional view taken along line 13—13 of Figure 7.

Figure 1:
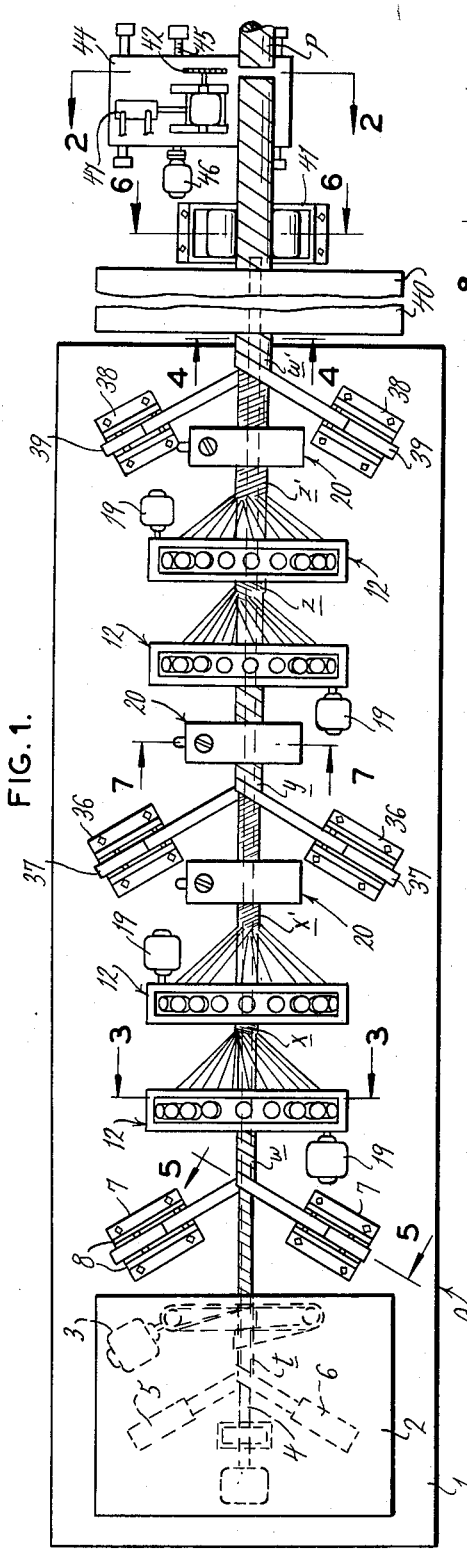

Referring now in more detail and by reference characters to the drawings, which illustrate a preferred embodiment of the present invention, A designates a synthetic pipe or tube manufacturing machine comprising a rectangular base plate or machine bed 1 conventionally mounted upwardly above, and extending horizontally across, the floor or other suitable supporting structure. Suitably mounted upon the upper face of the base plate 1 (reference being made to the left end of Figure 1) is a conventional tube winding unit 2. Since the tube winding unit 2 may be of any suitable design, it may be schematically designated in Figure 1 by dotted lines, and, as is shown, includes a driving motor 3, a stationary mandrel 4, roll stands 5, 6, for supporting rolls of cardboard tape which are spirally wound on the mandrel and glued to each other to provide a continuous cardboard tube t. Also bolted to the base plate 1 on opposite sides of the mandrel 4 forwardly of the tube winding unit 2 are identical roll stands 7, each comprising two spaced parallel vertical plates 8 provided adjacent their upper margins with angularly downwardly extending slots 9 for rotatably supporting a removable shaft 10. Supported upon the shafts 10 of each of the roll stands 7 are rolls of a parting material, such as plain or unlacquered cellophane tape 11. As will be seen by reference to Figure 1, the roll stands 7 are disposed at equal and opposite angles with respect to the longitudinal axis of the mandrel 4, so that the webs of tape 11 can be wrapped oppositely around the forwardly progressing and rotating cardboard tube t to form a two-ply spiral winding w which feeds forwardly along with the tube t. Preferably the mandrel 4 is provided with a very slight forward taper, that is to say, the forward end is several thousandths of an inch smaller than the rear end, so that the tube t will draw smoothly and continuously along the mandrel 4.

Bolted upon the top face of the base plate 1 and extending vertically upwardly from, and in forwardly spaced relation to, the roll stands 7 in successive order are two conventional circular multi-strand winding units 12 disposed concentrically around the tube t and mandrel 4. Each winding unit 12 comprises a rectangular frame 13 supporting four pinions 14, which, in turn, mesh with and support a ring gear 15 having an annular flange 16 upon which is journaled a plurality of uniformly spaced radial spool-holding spindles 17 for operatively supporting spools 18 of fiber-glass roving formed in strands s. The spool-holding spindles 17 are each provided with a thread-guide 17' through which the strand s is threaded and directed radially inwardly to be wrapped around the surface of the winding w upon the tube t. One of the pinions 14 is drivingly connected to an electric motor 19 and rotates the ring gear 15 and the spool 18 carried thereby in timed relation to the forward feeding movement of the tube t, thereby applying a tight layer x of spirally wound strands of fiber-glass roving. The second winding unit 12 similarly applies a second layer x' of spirally wound fiber-glass strands.

Similarly bolted upon, and extending vertically above, the base plate 1 is a coating tank 20 having front and back walls 21, 22, respectively provided with substantially concentric apertures 23, 24, through which the partially formed pipe continuously passes as it moves along the mandrel 4. The tank 20 is furthermore provided with a centrally depressed hopper-shaped bottom wall 25 connected at its lowest point to a fitting 26, which is, in turn, connected to the intake 27 of a re-circulating pump 28 operatively driven by an electric motor 29 and having a discharge line 30 which is connected by means of a riser 31 to a spray pipe 32 extending horizontally across the top of the tank 20 and is provided with a plurality of spray nozzles 33 directed angularly downwardly upon the partially formed pipe passing therethrough. The tank 20 is partially filled with a supply of a suitable synthetic polyester resin solution which is pumped up to the spray nozzles 33 and sprayed upon the spirally wound layer of fiber-glass strands x, thoroughly coating and impregnating this layer with the liquid resin solution. As the coated partially formed pipe travels forwardly through the opening 24, it passes through a resilient squeegeeing collar or annulus 34 which is preferably made of rubber and which removes any excess liquid and returns it to the tank 20 for re-circulation, together with any excess liquid which otherwise runs off after application. The tank 20 is suitably provided with a removable screw plug 35 by which additional liquid may be added to the tank 20 from time to time as needed. It should be noted in this connection that automatic float control liquid supply means may be provided, but this is entirely a conventional expedient, and, since it does not form a part of the present invention, no effort has been made to particularly describe such means.

Similarly mounted on the base plate 1 on opposite sides of the mandrel 4 and forwardly of the tank 20 are roll stands 36 which are substantially identical with the previously described roll stands 7 and support rolls of fiberglass tape 37 which may be of matted random-fiber construction, of woven fabric construction, or of uni-directional parallel strand construction. Oppositely running webs of tape are fed from the roll stands 36 and are wrapped around the liquid-coated layers x, x', of fiberglass strands to form a spirally wound double-ply layer of fiber-glass fabric y.

Similarly mounted upon the base plate 1 forwardly of the roll stands 36 is a second coating tank 20 through which the partially formed pipe passes and in which the layer y is, in turn, impregnated with the polyester resin.

Bolted upon and extending upwardly from the base plate 1 forwardly of the second coating tank 20 are two more successively positioned winding units 12, which are identical in all respects with the previously described winding units 12 and function to apply additional layers z, z', of spirally wound strands of fiber-glass roving. Forwardly of the last winding unit 12 is a third coating tank 20 in which the additional layers z, z', are impregnated with polyester resin solution.

Finally, the base plate 1 is provided on opposite sides of the mandrel 4 with two roll stands 38, which are substantially identical with the previously described roll stands 7 and 36 and support rolls of cellophane tape 39 for applying a spirally wound two-ply external wrapping w' of cellophane tape. Cellophane is one of a group of unique films which have the property of shrinking somewhat when heated. Thus, when the wrapping w' is exposed to heat in the oven, as will presently be more fully described, it tends to shrink and applies substantial pressure to the laminate structure during polymerization.

Figure 2:
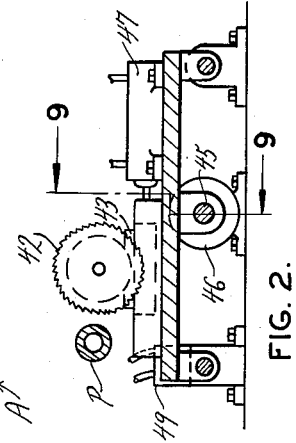
Figure 6:
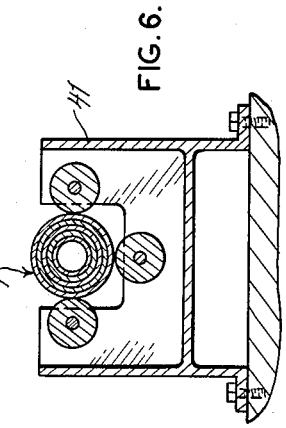
Figure 9:
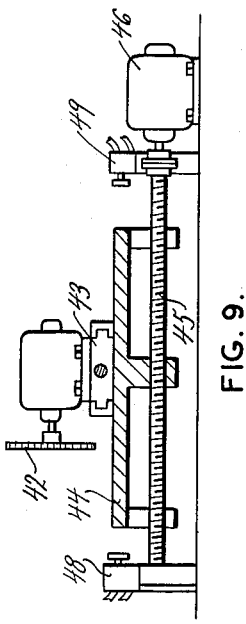
Figure 9 is a fragmentary sectional view taken along line 9—9 of Figure 2.

Forwardly of the base plate 1 is a conventional tunnel-type oven 40 through which the completely formed pipe is continuously fed, and beyond the oven 40 is a conventional steady rest 41 and flying cut-off saw 42 mounted in a pneumatically shifted slide 43, which is, in turn, mounted on a traversing table 44 fed to and fro lengthwise of the tube path by a feed screw 45 driven by a reversing motor 46, as shown in Figures 2 and 9. The slide 43 is actuated by a pneumatic cylinder 47, which is controlled by two valves 48, 49, located at opposite ends of the traversing table 44 and are actuated by impact therewith to shift the slide 43 away from the finished pipe P as the table 44 reaches the forward end of its stroke and to shift it in toward the finished pipe P as the traversing table 44 reaches the rearward end of its stroke. The valve system is conventional and is, therefore, not described in detail. The speed of the reversing motor 46 and the pitch of the feed screw 45 are such that, during forward movement, the traversing table 44 will have the same speed as the forward speed of the finished pipe P and the length of the path of movement of the traversing table 44 will determine the length of the section of finished pipe P which is cut off during each stroke.

Figure 4:
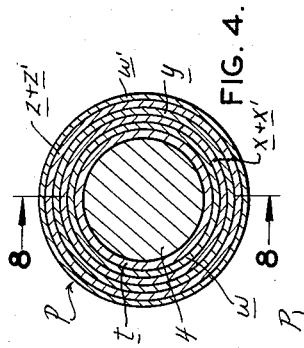
Figure 8:
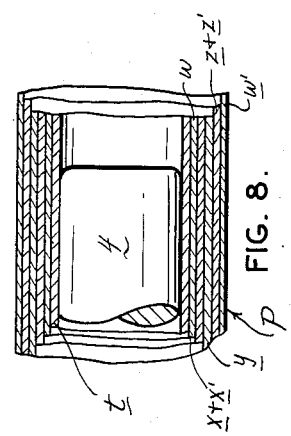
Figure 8 is a fragmentary sectional view taken along line 8—8 of Figure 4.

After the sections are cut off, they will consist of an inner cardboard tube, an inner double-ply parting layer of cellophane tape, the several built-up layers of now consolidated and polymerized resin fiber-glass pipe, and an external two-ply covering layer of cellophane tape, as diagrammatically shown in Figures 4 and 8. Thus, to finish the section of synthetic pipe, it is simply necessary to remove, in any suitable manner, the exterior cellophane wrapping and the interior cardboard tube and cellophane parting layer. It has been found in connection with the present invention that even after heat curing or polymerization, the cellophane tape is readily separable from the synthetic tubing and, consequently, the external wrappings and internal cardboard tubing can be very quickly and conveniently removed, leaving a clean bore rigid section of plastic pipe.

Actual field tests with synthetic pipe constructed in accordance with the present invention have revealed that the material has practically no affinity for the wax, paraffin, and tars usually present in crude oil and, therefore, can be used in a crude oil gathering system for months on end without accumulating a bore-reducing internal layer or deposit of paraffin, wax, and the like. Pressure tests have shown that synthetic pipes and tubing made in accordance with the present invention have a bursting strength comparable to that of metallic pipes and tubes of similar weight, size, and thickness and are, therefore, entirely satisfactory for use in shipboard steam-pipe installation and the like.

In addition to this, field tests have also shown that synthetic pipes made in accordance with the present invention are electrolytically inert when buried beneath the earth or submerged beneath a body of water in the manner of conventional pipe and gas lines and, therefore, can be used for pipeline purposes without wrapping or other electrolysis-preventing expedients and affords every indication of extremely long life and durability in this type of engineering application.

Other stands, such as ceramic metallic and organic textile fibers and synthetic resins, which are compatible therewith, may be used instead of the fiber glass and polyester resin materials hereinbefore specifically mentioned, and it should be understood that changes and modifications in the form, construction, arrangement, and combination of the several parts of the high-pressure nonmetallic tubing and in the steps of its production may be made and substituted for those herein shown and described without departing from the nature and principle of our invention.

Having thus described our invention, what we claim and desire to secure by Letters Patent is:

1. The method of forming pipe which comprises forming a spirally wound cardboard tube upon a mandrel, feeding the cardboard tube progressively along the mandrel in the direction of the longitudinal axis of the mandrel, continuously applying a spiral winding of parting material around the outside of the tube so that the winding will move with the tubing, applying a spiral winding of textile-type fiber glass roving upon the external face of the parting material, applying a film of unpolymerized polyester resin to said last named winding, applying a spiral winding of flat fiber glass tape externally upon the layer formed by the spirally wound roving, applying a film of unpolymerized polyester resin to said last named winding, heat curing the resin to form a resin bonded cylindrical section of pipe, and thereafter removing the internal winding of parting material.

2. The method of forming pipe which comprises spirally winding a continuous web of cardboard tape upon a mandrel to form thereon a continuous cardboard tube, feeding the cardboard tube progressively along the mandrel in the direction of the longitudinal axis of the mandrel, continuously applying a winding of parting material around the outside of the tube so that the winding will move with the tubing, applying a layer formed of a plurality of strands of textile-type fiber glass roving simultaneously wound in side-by-side spiral relation upon the external face of the parting material, applying a film of unpolymerized polyester resin to said layer, applying a spiral winding of relatively wide fiber glass tape of matted random-fiber construction externally upon the layer formed by the spirally wound roving, said tape being applied so as to overlap and bind down a relatively large number of convolutions of the strands forming the layer applying a film of unpolymerized polyester resin to said last named winding, a heat curing the resin to form a resin bonded cylindrical section of pipe, and thereafter removing the internal cardboard tube and winding of parting material.

3. The method of forming pipe which comprises spirally winding a continuous web of cardboard tape upon a mandrel to form thereon a continuous cardboard tube, feeding the cardboard tube progressively along the mandrel in the direction of the longitudinal axis of the mandrel, continuously applying a winding of parting material around the outside of the tube so that the winding will move with the tubing, applying a layer formed of a plurality of strands of textile-type fiber glass roving simultaneously wound in side-by-side spiral relation upon the external face of the parting material, applying a film of unpolymerized polyester resin to said layer, applying a spiral winding of relatively wide fiber glass tape of woven fabric construction externally upon the layer formed by the spirally wound roving, said tape being applied so as to overlap and bind down a relatively large number of convolutions of the strands forming the layer applying a film of unpolymerized polyester resin to said last named winding, heat curing the resin to form a resin bonded cylindrical section of pipe, and thereafter removing the internal cardboard tube and winding of parting material.

4. The method of forming pipe which comprises spirally winding a continuous web of cardboard tape upon a mandrel to form thereon a continuous cardboard tube, feeding the cardboard tube progressively along the mandrel in the direction of the longitudinal axis of the mandrel, continuously applying a winding of parting material around the outside of the tube so that the winding will move with the tubing, applying a layer formed of a plurality of strands of fiber glass roving upon the external face of the parting material, applying a liquid film of unpolymerized polyester resin to said last named winding, applying a spiral winding of fiber glass tape externally upon the layer formed by the spirally wound roving, applying a liquid film of unpolymerized polyester resin to said last named winding, heat curing the resin to form a resin bonded cylindrical section of pipe, and thereafter removing the internal cardboard tube and winding of parting material.

5. The method of forming pipe which comprises spirally winding a continuous web of cardboard tape upon a mandrel to form thereon a continuous cardboard tube, feeding the cardboard tube progressively along the mandrel in the direction of the longitudinal axis of the mandrel, continuously applying a winding of parting material around the outside of the tube so that the winding will move with the tubing, applying a layer formed of a plurality of strands of fiber glass roving upon the external face of the parting material, applying a liquid film of unpolymerized polyester resin to said layer, applying a spiral winding of fiber glass tape of matted random-fiber construction externally upon the layer formed by the spirally wound roving, said tape being applied so as to overlap and bind down a relatively large number of convolutions of the strands forming the layer applying a liquid film of unpolymerized polyester resin to said last named winding, heat curing the resin to form a resin bonded cylindrical section of pipe, and thereafter removing the internal cardboard tube and winding of parting material.

6. The method of forming pipe which comprises spirally winding a continuous web of cardboard tape upon a mandrel to form thereon a continuous cardboard tube, feeding the cardboard tube progressively along the mandrel in the direction of the longitudinal axis of the mandrel, continuously applying a winding of parting material around the outside of the tube so that the winding will move with the tubing, applying a layer formed of a plurality of strands of fiber glass roving upon the external face of the parting material, applying a film of unpolymerized polyester resin to said layer, applying a spiral winding of fiber glass tape of woven fabric construction externally upon the layer formed by the spirally wound roving, said tape being applied so as to overlap and bind down a relatively large number of convolutions of the strands forming the layer applying a film of unpolymerized polyester resin to said last named winding, heat curing the resin to form a resin bonded cylindrical section of pipe, and thereafter removing the internal cardboard tube and winding of parting material.

7. The method of forming pipe which comprises spirally winding a continuous web of cardboard tape upon a mandrel to form thereon a continuous cardboard tube, feeding the cardboard tube progressively along the mandrel in the direction of the longitudinal axis of the mandrel, continuously applying a winding of parting material around the outside of the tube so that the winding will move with the tubing, applying a layer formed of a plurality of strands of fiber glass roving upon the external face of the parting material, applying a liquid film of unpolymerized polyester resin to said layer, applying a spiral winding of fiber glass tape of unidirectional parallel strand construction externally upon the layer formed by the spirally wound roving, said tape being applied so as to overlap and bind down a relatively large number of convolutions of the strands forming the layer applying a liquid film of unpolymerized polyester resin to said last named winding, heat curing the resin to form a resin bonded cylindrical section of pipe, and thereafter removing the internal cardboard tube and winding of parting material.

8. The method of forming pipe which comprises spirally winding a continuous web of cardboard tape upon a mandrel to form thereon a continuous cardboard tube, feeding the tube progressively along the mandrel in the direction of the longitudinal axis of the mandrel, continuously applying a winding of parting material around the outside of the tube so that the winding will move with the tube, applying a spiral winding of fiber glass roving upon the external face of the parting material, applying a film of unpolymerized polyester resin to said last named winding, applying a spiral winding of matted fiber glass tape externally upon the layer formed by the spirally wound roving, applying a film of unpolymerized polyester resin to said last named winding, applying an external spiral winding of parting material upon the external surface of the last named resin coated winding, heat curing the resin to form a resin bonded cylindrical section of pipe, and thereafter removing the internal cardboard tube and winding of parting material.

9. Apparatus for the manufacture of pipe which comprises a tunnel-type oven, a mandrel extending lengthwise through the oven and projecting outwardly therefrom at opposite ends, means operatively located adjacent one projecting end of the mandrel for forming a spirally wound tube upon the mandrel, means for rotatively and translatively moving the tube along the mandrel and through the oven, means for forming successive layers of spirally wound strands of textile-type roving upon the tube, each such means comprising an annular collar having a plurality of radial spools, means associated with each spool for feeding a strand from such spool to the mandrel and spirally winding such strand thereon and means for applying a non-polymerized liquid resin to said successive layers.

10. Apparatus for the manufacture of pipe which comprises a tunnel-type oven, a mandrel extending lengthwise through the oven and projecting outwardly therefrom at opposite ends, means operatively located adjacent one projecting end of the mandrel for forming a spirally wound tube upon the mandrel, means for covering the tube with a layer of parting material, means for rotatively and translatively moving the tube along the mandrel and through the oven, means for forming successive layers of spirally wound strands of textile-type roving upon the tube, each such means comprising an annular collar having a plurality of radial spools, means associated with each spool for feeding a strand from such spool to the mandrel and spirally winding such strand thereon and means for applying a non-polymerized liquid resin to said successive layers.

11. Apparatus for the manufacture of pipe which comprises a tunnel-type oven, a mandrel extending lengthwise through the oven and projecting outwardly therefrom at opposite ends, means operatively located adjacent one projecting end of the mandrel for forming a spirally wound paper tube upon the mandrel, means for rotatively and translatively moving the tube along the mandrel and through the oven, means for forming successive layers of spirally wound strands of textile-type roving upon the tube, each such means comprising an annular collar having a plurality of radial spools, means associated with each spool for feeding a strand from such spool to the mandrel and spirally winding such strand thereon and means for applying a non-polymerized liquid resin to said successive layers.

12. Apparatus for the manufacture of pipe which comprises a tunnel-type oven, a mandrel extending lengthwise through the oven and projecting outwardly therefrom at opposite ends, means operatively located adjacent one projecting end of the mandrel for forming a spirally wound tube upon the mandrel, means for rotatively and translatively moving the tube along the mandrel and through the oven, means for forming successive layers of spirally wound strands of textile-type roving upon the tube, each such means comprising an annular collar having a plurality of radial spools, means associated with each spool for feeding a strand from such spool to the mandrel and spirally winding such strand thereon, means for applying a non-polymerized liquid resin to said successive layers, and cut-off means operatively located outwardly of the other end of the mandrel.

References Cited in the file of this patent

UNITED STATES PATENTS

| | | |
|---|---|---|
| 2,380,111 | Kasten | July 10, 1945 |
| 2,402,038 | Goldman et al. | June 11, 1946 |
| 2,416,416 | Stoltz | Feb. 25, 1947 |
| 2,594,693 | Smith | Apr. 29, 1952 |
| 2,609,319 | Boge | Sept. 2, 1952 |
| 2,614,058 | Francis | Oct. 14, 1952 |
| 2,643,700 | Havens | June 30, 1953 |